(12) United States Patent
Stadelmann et al.

(10) Patent No.: US 12,601,845 B2
(45) Date of Patent: Apr. 14, 2026

(54) GPS SPOOFER DIRECTION FINDING AND GEOLOCATION

(71) Applicant: BAE Systems Information and Electronic Systems Integration Inc., Nashua, NH (US)

(72) Inventors: Scott W. Stadelmann, Cedar Rapids, IA (US); Brian J. Herting, Cedar Rapids, IA (US); Noah J. Banwarth, Marion, IA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 283 days.

(21) Appl. No.: 18/583,211

(22) Filed: Feb. 21, 2024

(65) Prior Publication Data

US 2025/0264617 A1    Aug. 21, 2025

(51) Int. Cl.
*G01S 19/21*        (2010.01)

(52) U.S. Cl.
CPC .................................. *G01S 19/215* (2013.01)

(58) Field of Classification Search
CPC .............................................. G01S 19/21–215
See application file for complete search history.

(56) References Cited

U.S. PATENT DOCUMENTS 6,771,214 B2    8/2004    Kober et al.
7,250,903 B1    7/2007    McDowell

| | | |
|---|---|---|
| 7,688,261 B2 | 3/2010 | DiEsposti |
| 7,764,224 B1 * | 7/2010 | Anderson ............. G01S 19/215 |
| | | 342/357.27 |
| 7,912,643 B1 | 3/2011 | Bean et al. |
| 9,910,160 B2 | 3/2018 | Geren et al. |
| 9,958,549 B2 | 5/2018 | Psiaki et al. |
| 10,024,973 B1 | 7/2018 | Alexander et al. |

(Continued)

OTHER PUBLICATIONS

Jones, Michael. "Anti-Jam Technology: Demystifying the CRPA—GPS World." GPS World—The Business and Technology of Global Navigation and Positioning, (Apr. 12, 2017). Retrieved from the Internet at: www.gpsworld.com/anti-jam-technology-demystifying-the-crpa/. 10 pages.

*Primary Examiner* — Cassi J Galt
(74) *Attorney, Agent, or Firm* — Scott J. Asmus

(57) ABSTRACT

Techniques for direction finding and geolocation of a GPS spoofer. A methodology implementing the techniques according to an embodiment includes steering a beam in a direction selected from a search constellation and measuring a first signal power received through the steered beam. The method also includes steering a null in the selected direction and measuring a second signal power received through the steered null. The method further includes calculating a difference between the first signal power and the second signal power and estimating an angle of arrival (AOA) of the GPS spoofer signal as the selected direction if the calculated difference exceeds a threshold power value. In some such examples, the method includes accumulating signals having four similar estimated AOAs, associated with unique pseudo-random noise codes, and employing a GPS receiver to calculate a candidate position of a source of the GPS spoofer signals based on the accumulated signals.

20 Claims, 6 Drawing Sheets

GPS Spoofer DF and Geolocation System
100

(56) References Cited

U.S. PATENT DOCUMENTS

| | | | |
|---|---|---|---|
| 10,031,234 B1 | 7/2018 | Alexander | |
| 10,274,579 B2 | 4/2019 | Pellegrini et al. | |
| 10,545,246 B1 | 1/2020 | Johnston et al. | |
| 10,609,568 B2 | 3/2020 | Ellum et al. | |
| 10,725,182 B2 | 7/2020 | Boyer et al. | |
| 10,739,466 B2 | 8/2020 | Grobert | |
| 10,775,510 B2 | 9/2020 | Agee | |
| 10,948,602 B1 | 3/2021 | Alexander et al. | |
| 10,983,220 B2 | 4/2021 | Ashjaee | |
| 10,996,339 B2 | 5/2021 | Agee | |
| 11,181,646 B2 | 11/2021 | Boyer et al. | |
| 11,194,053 B1 | 12/2021 | Johnston et al. | |
| 11,300,687 B2 * | 4/2022 | Jaeckle | G01S 3/48 |
| 11,693,122 B1 | 7/2023 | Alexander et al. | |
| 11,709,274 B2 | 7/2023 | Gum et al. | |
| 11,733,389 B1 | 8/2023 | Johnston et al. | |
| 12,184,409 B1 * | 12/2024 | Stockmaster | H04K 3/228 |
| 2021/0211170 A1 | 7/2021 | Lai et al. | |
| 2023/0314621 A1 * | 10/2023 | Johnston | G01S 19/21 |
| | | | 342/357.62 |

* cited by examiner

GPS Spoofer DF and Geolocation System
100

Spoofer AOA Estimator
150

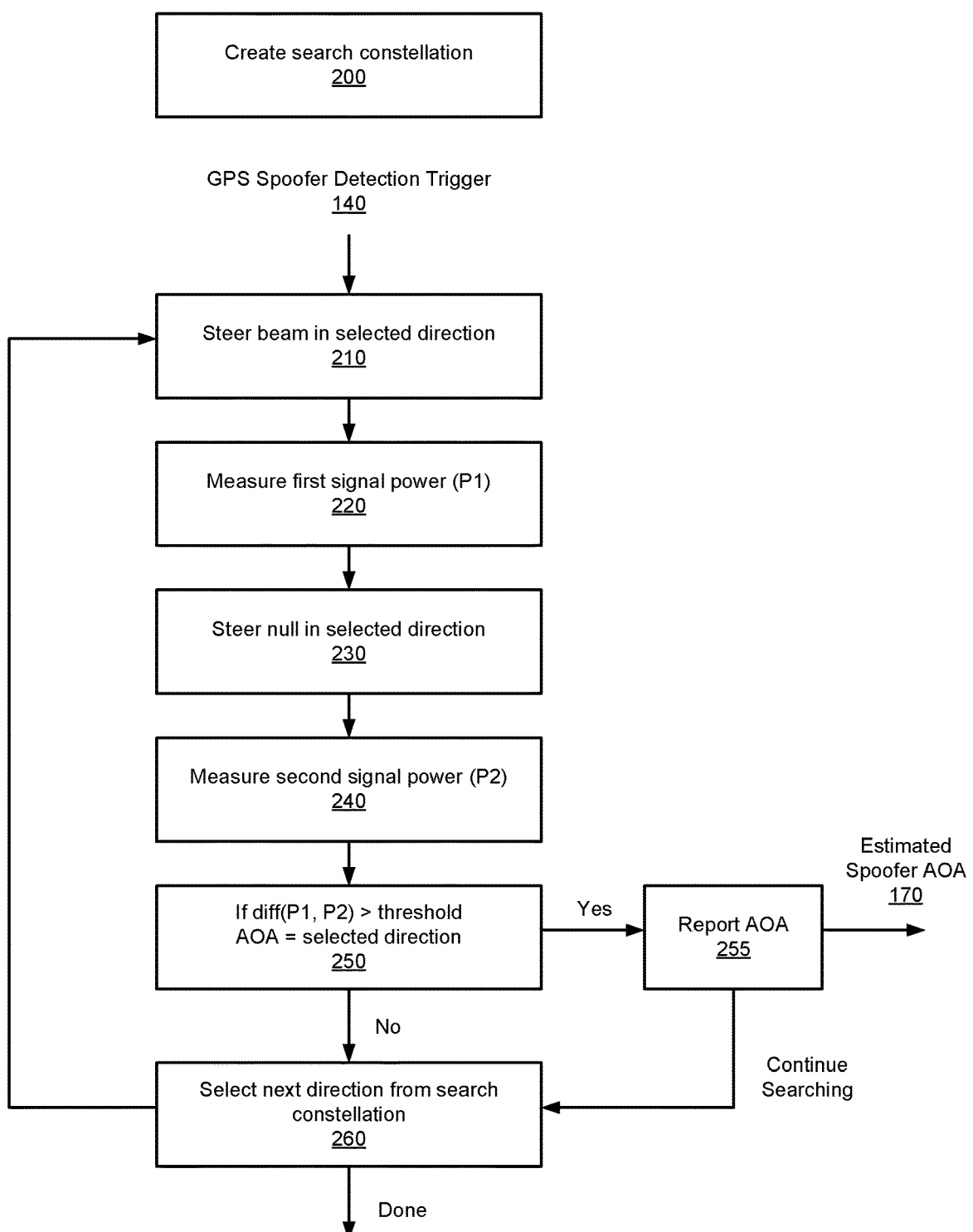

Create search constellation
200

GPS Spoofer Detection Trigger
140

Steer beam in selected direction
210

Measure first signal power (P1)
220

Steer null in selected direction
230

Measure second signal power (P2)
240

If diff(P1, P2) > threshold
AOA = selected direction
250

Yes

Report AOA
255

Estimated
Spoofer AOA
170

No

Select next direction from search
constellation
260

Continue
Searching

Done

FIG. 2

Search Constellation
300

500

Processing Platform
600

GPS SPOOFER DIRECTION FINDING AND GEOLOCATION

FIELD OF DISCLOSURE

The present disclosure relates to electronic countermeasures, and more particularly, to a direction finding and geolocation system configured to locate a GPS spoofer.

BACKGROUND

GPS technology has been adopted into widespread use to provide location, timing, and navigation assistance for countless applications. Commercial aircraft, satellites, ships, trains, trucks, and vehicles use GPS for location and tracking. Many military applications depend on GPS, for example, to provide targeting of weapons systems and navigation functionality for aircraft, ships, ground vehicles, and ground troops. Unfortunately, GPS receivers can be spoofed by criminals, hackers, and adversaries. These parties may broadcast false GPS signals that mimic authentic GPS signals and introduce errors that render the GPS receiver ineffective. Such false GPS signals emanate from what is known as a GPS spoofer.

BRIEF DESCRIPTION OF THE DRAWINGS

FIG. 2 is a block diagram of the spoofer angle of arrival (AOA) estimator of the system of FIG. 1, configured in accordance with certain embodiments of the present disclosure.

Figure 1:
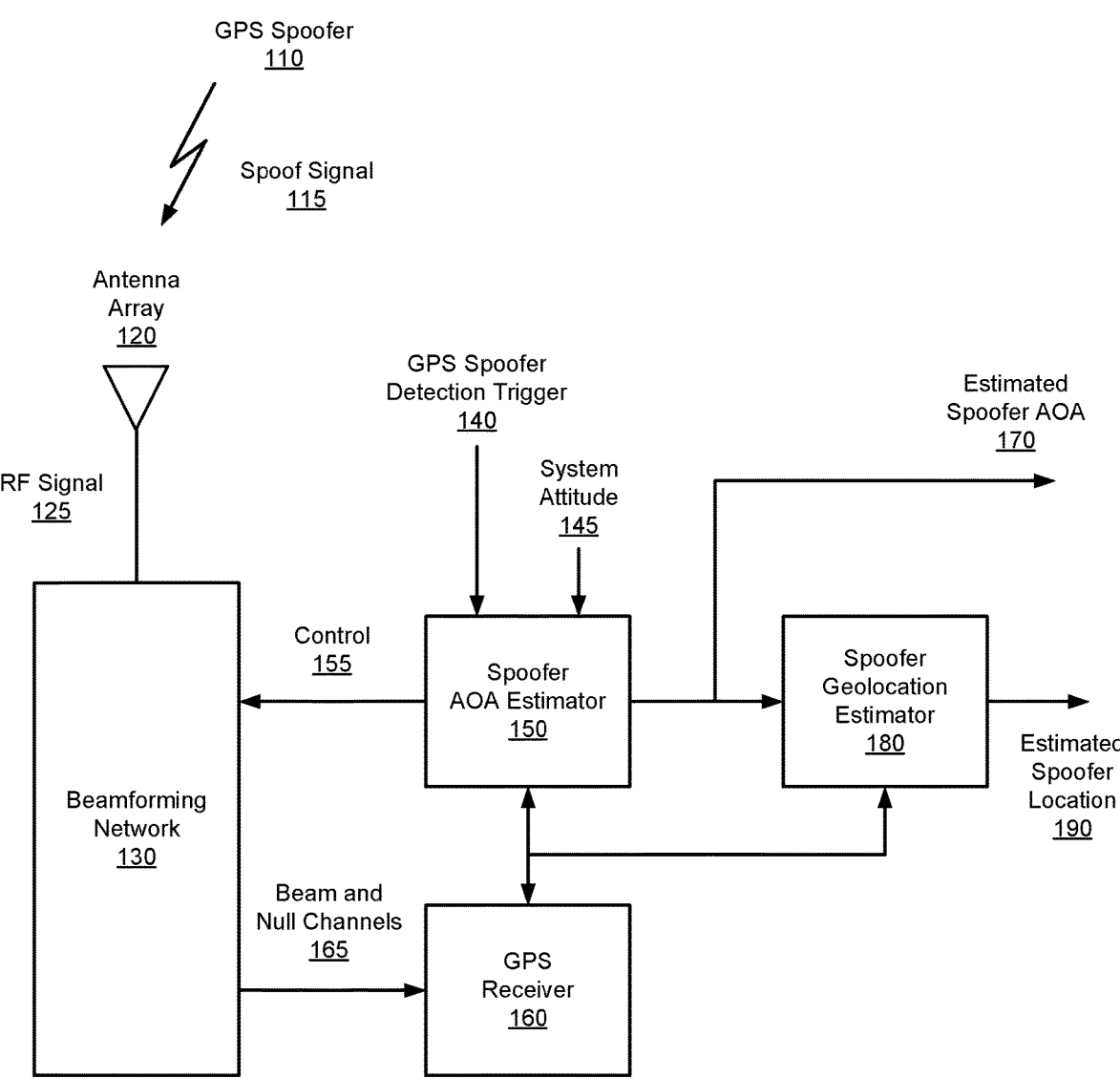
FIG. 1 illustrates a GPS spoofer direction finding and geolocation system, in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Techniques are provided herein for direction finding and geolocation of a GPS spoofer. As noted above, GPS receivers can be interfered with or otherwise spoofed by malicious actors that transmit fake signals which mimic an authentic GPS signal. Such spoofing can cause the GPS receiver to provide erroneous timing, position, and navigation information. While techniques exist to detect the presence of GPS spoofing signals, these techniques generally do not provide information that can be used to estimate an AOA or a location of the source of the spoofer signal. Additionally, techniques used to locate jammers rely on the fact that jamming signals are broadcast at relatively high power levels and these techniques are not suitable for GPS spoofer signals that are broadcast at relatively low power levels (e.g., frequently below the thermal noise floor).

To this end, techniques are provided to estimate an AOA of a GPS spoofing signal and, in some cases, estimate the geolocation of the source of the GPS spoofing signal. In an example, the AOA estimation technique steers an antenna beam and an antenna null to a number of directions selected from a search pattern or search constellation. If the spoofed signal is arriving from the selected search direction, a relatively significant difference in power is expected between the beamformed channel and the null formed channel. Additionally, if the source of the spoofed signal is a GPS constellation repeater spoofer (e.g., a system that rebroadcasts valid GPS signals received from GPS satellites), the spoofed signals can be used to locate the repeater spoofer, as will be explained in greater detail below.

A system to implement the disclosed techniques can be hosted on, or otherwise be incorporated into the electronic systems of an aircraft, UAV, munition, satellite, maritime vessel or ground vehicle, a navigation system, an anti-jamming system, a tracking ground station, a personal computer, workstation, laptop computer, tablet, touchpad, portable computer, handheld computer, cellular telephone, smartphone, embedded system, or any other platform where GPS spoofer direction finding is needed.

In accordance with an embodiment, an example methodology to implement these techniques includes steering a beam in a direction selected from a search constellation and measuring a first signal power received through the steered beam. The method also includes steering a null in the selected direction and measuring a second signal power received through the steered null. The method further includes calculating a difference between the first signal power and the second signal power and estimating an AOA of the GPS spoofer signal as being the selected direction if the calculated difference exceeds a threshold power value. GPS signals are modulated by Pseudo-Random Noise (PRN) codes that can serve to identify the satellite that transmits the signal. The method may further include accumulating four or more signals with unique PRN codes and similar estimated AOAs (e.g., differing by less than a threshold angular value). The method according to some such examples further includes employing a GPS receiver to calculate a candidate position of the source of the GPS spoofer signal based on the four or more unique PRN code signals with similar AOAs. The candidate position is determined to be the estimated position of the source of the GPS spoofer signal if the direction to the candidate position aligns with the estimated AOAs of the spoof signals. Once the spoofer position is determined, various measures can be taken to eliminate or mitigate the spoofer, and the spoofer position can be communicated to other systems to remediate further issues.

Although the techniques described herein are applied to GPS signals, they may also be applied to signals from other Global Navigation Satellite Systems (GNSS), such as, for example, the Galileo, GLONASS, BEIDOU, and QZSS systems.

It will be appreciated that the techniques described herein may provide information of strategic value (e.g., a direction, and in some cases, a location) of a GPS spoofer, compared to existing techniques that only detect the presence of spoofer signals. The techniques disclosed herein may further be implemented in hardware or software or a combination thereof. Numerous embodiments and applications will be apparent in light of this disclosure.

System Architecture

FIG. 1 illustrates a GPS spoofer direction finding and geolocation system 100, in accordance with certain embodiments of the present disclosure. The system is shown to include an antenna array 120, a beamforming network 130, a spoofer AOA estimator 150, a spoofer geolocation estimator 180, and a GPS receiver 160.

The antenna array 120 (sometimes referred to as a controlled reception pattern antenna) is configured to receive radio frequency (RF) signals 125 from any number of sources which may include, for example, spoofer signals 115 broadcast by a GPS spoofer 110.

The beamforming network 130 is configured to generate beamforming patterns (beams) and nullforming patterns (nulls) by adjusting the phases of the signals received by each of the antennas of the array 120. A beam increases the gain of the antenna array in the direction of the beam while a null decreases the gain of the antenna array in the direction of the null. Beamforming network 130 may generate the beams and nulls in any desired directions (e.g., specified azimuth and elevation angles) based on control signals 155 received from other components of the system such as spoofer AOA estimator 150, spoofer geolocation estimator 180, and GPS receiver 160, as will be explained below. Signals received through the beams and nulls are provided to the GPS receiver 160 over beam channels and null channels 165.

The spoofer AOA estimator 150 is configured to generate an AOA estimate 170 of a GPS spoofing signal 115. Operation of the spoofer AOA estimator is described in greater detail below, but at a high level, the spoofer AOA estimator is configured to estimate an AOA of a GPS spoofing signal by measuring the power difference between signals received through antenna beams and antenna nulls that are steered to the search directions. If the spoofing signal is arriving from the selected search direction, there will be a relatively large power difference between the beamformed channel and the null formed channel. If the spoofing signal is arriving from a different direction, however, the power difference will be smaller. Thus, if the power difference exceeds a threshold value, the spoofer signal is determined to arrive from that search direction. The threshold power value is application dependent and, in some embodiments, may be predetermined or otherwise provided by a user of the system. The threshold value may be selected based on operational requirements, such as probability of detection versus probability of false alarm, or other operational requirements.

The spoofer geolocation estimator 180 is configured to generate an estimated location 190 of the GPS spoofer 110 (e.g., the location of the source of the spoofer signal 115), when the GPS spoofer 110 is a GPS constellation repeater spoofer. Operation of the spoofer geolocation estimator is described in greater detail below, but at a high level, the spoofer geolocation estimator is configured to identify four or more signals with unique (e.g., different) PRN codes and substantially similar estimated AOAs (provided by the spoofer AOA estimator 150). GPS signals are modulated by PRN codes that can serve to identify the satellite that transmits the signal. Signals having different PRN codes and similar AOAs may originate from different satellites in a similar region of the sky, or they may be multiple spoofer signals. The GPS receiver 160 is employed to calculate a candidate position of the GPS spoofer. If the candidate position is in the direction of the previously estimated AOAs, confidence increases that a repeater spoofer is located in that direction and at the coordinates of the candidate position. If the candidate position is located in a different direction, it is more likely that a non-repeater spoofer exists in the previously estimated direction but at an unknown specific location.

FIG. 2 is a block diagram of the spoofer AOA estimator 150 of FIG. 1, configured in accordance with certain embodiments of the present disclosure. The spoofer AOA estimator is shown to perform a number of operations.

Figure 3:
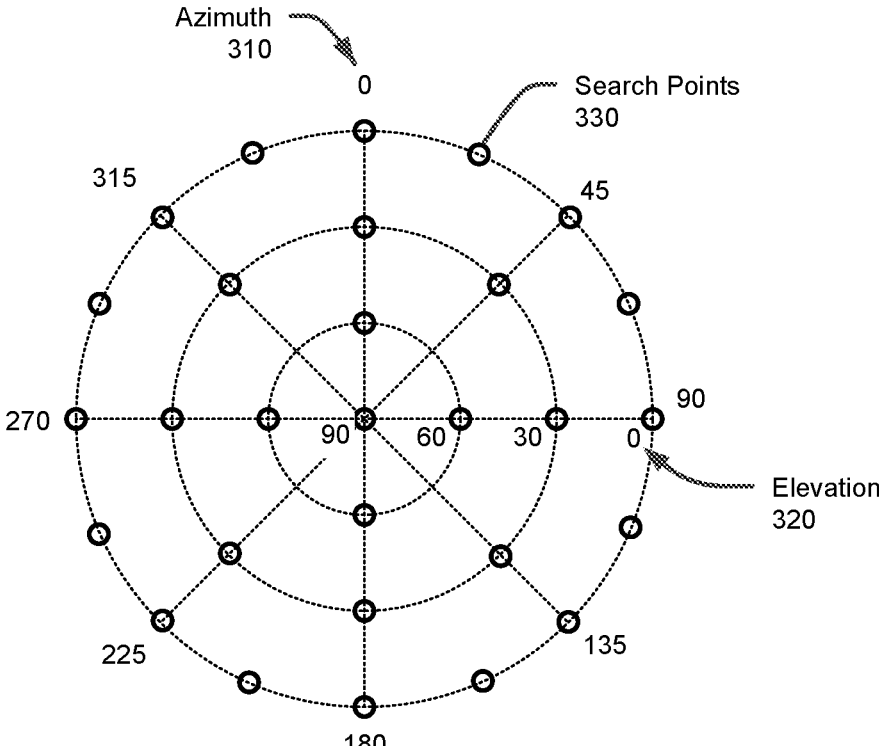
FIG. 3 illustrates a search constellation, in accordance with certain embodiments of the present disclosure.

At operation 200, a search constellation is created to guide a search for the GPS spoofer 110, over varying AOA directions. In some embodiments, the spatial search may proceed sequentially through the constellation, while in some other embodiments multiple points in the constellation may be searched in parallel as computational resources permit. FIG. 3 illustrates one such search constellation 300, in accordance with certain embodiments of the present disclosure. The search constellation 300 is shown to include a number of search points 330 that are spatially distributed across azimuth angles 310 and elevation angles 320 which are visible to the antenna array 120.

In some embodiments, the search points 330 are equally distributed across the hemisphere so that higher elevations (e.g., closer to 90 degrees) have fewer azimuth points than lower elevations, as shown in FIG. 3. In some embodiments, the search points may be concentrated or restricted to points near the horizon (e.g., lower elevation angles) owing to the fact that GPS spoofers 110 are often ground based rather than in Earth orbit.

In some embodiments, search points in the direction of true GPS satellites may be omitted. Determination of the direction of true GPS satellites in antenna coordinates may be calculated based on provided information that includes the current time and position of the platform, a satellite constellation almanac, and antenna attitude (e.g., roll, pitch, and yaw) 145. In some embodiments, this information may be provided by a navigation system of the platform, an almanac or ephemeris, or from other suitable sources. In some embodiments, the antenna attitude 145 may be provided directly to the GPS receiver 160.

The process continues at operation 210, in response to a trigger 140 provided by an external spoofer detection system. The trigger 140 signals that a GPS spoofer has been detected, but from an unknown direction and location. At operation 210, a directional search commences by selecting an initial direction from the search constellation 300. The beamforming network 130 is employed to steer a beam in the selected direction, for example using control signals 155.

At operation 220, a first signal power (P1) is measured for the signal received through the beam channel (e.g., one of the channels 165).

At operation 230, the beamforming network 130 is employed to steer a null in the selected direction, for example using control signals 155. At operation 240, a second signal power (P2) is measured for the signal received through the null channel (e.g., one of the channels 165).

In some embodiments, operations 210 through 240 (e.g., steering the beam and the null, as well as performing the power measurements), may be performed in parallel to reduce the possibility of time-dependent variations in received signal power.

At operation 250, if the difference between P1 and P2 exceeds the power threshold value, then the currently selected direction is chosen as an estimated AOA 170 of the GPS spoofing signal 115. At operation 255, the estimated spoofer AOA 170 is reported to a user of the system, or a downstream application configured to act on that information.

At operation 260, a next direction is selected from the search constellation 300 and the process iterates by looping back to operation 210 until all directions from the search constellation (or all directions of interest) have been processed. Any number of additional estimated spoofer AOAs 170 may be obtained at each iteration if the conditions described above are met (e.g., the difference between P1 and P2 exceeding the power threshold value). In some embodiments, the search may be halted once a valid spoofer AOA for a particular spoofed signal has been found, rather than processing all directions from the search constellation.

In some embodiments, the spoofer AOA estimator 150 may be implemented as one or more processors configured to execute software to perform the functions of blocks 200 through 260.

Figure 4:
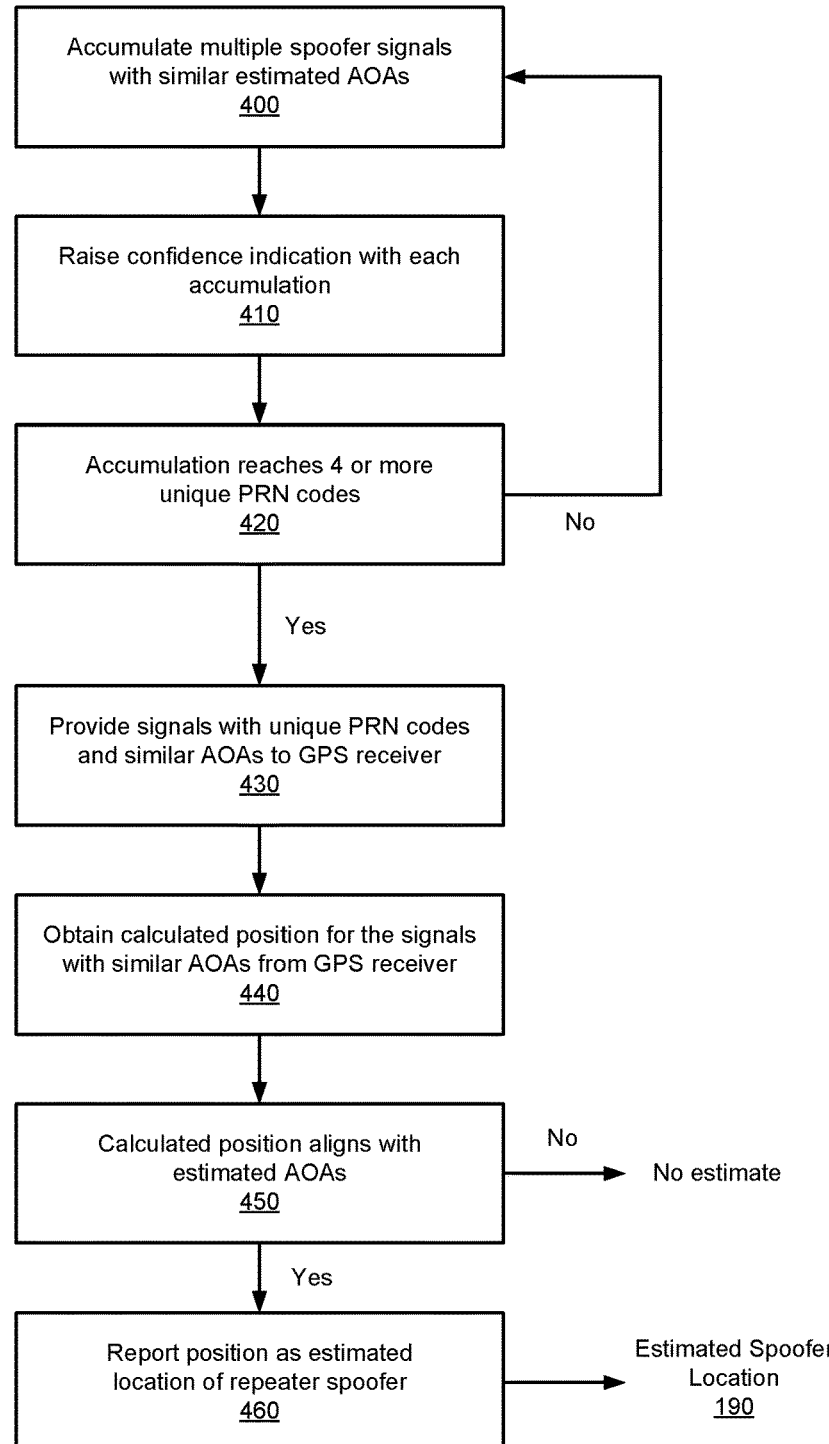
FIG. 4 is a block diagram of the spoofer geolocation estimator of the system of FIG. 1, configured in accordance with certain embodiments of the present disclosure.

FIG. 4 is a block diagram of the spoofer geolocation estimator 180 of FIG. 1, configured in accordance with certain embodiments of the present disclosure. The spoofer geolocation estimator is shown to perform a number of operations.

At operation 400, multiple spoofer signal AOAs, provided by the spoofer AOA estimator 150, are accumulated. AOAs that are substantially similar (e.g., AOAs that differ by less than a threshold angular value) are grouped together.

At operation 410, as the number of similar AOAs accumulate, confidence associated with the estimated spoofer direction increases. In some embodiments, a confidence indicator may be reported along with the estimated AOAs.

At operation 420, the process iterates back to operation 400 until four or more unique PRN codes with similar AOAs have been accumulated.

At operation 430, after four or more unique PRN codes with similar AOAs have been accumulated, those signals are provided to the GPS receiver 160.

At operation 440, a candidate position for the GPS spoofer 110 is obtained from the GPS receiver as a calculated navigation solution based on the provided signals with unique PRN codes and similar AOAs.

At operation 450, if the direction to the candidate position aligns with the four or more estimated AOAs, then that candidate position is determined to be the estimated geolocation 190 of the GPS spoofer 110. This will generally be true in the case of a GPS spoofer that is acting as a constellation repeater spoofer (e.g., a system that rebroadcasts valid GPS signals received from GPS satellites). In some embodiments, alignment is determined by calculating a direction from the platform to the candidate position, and if that direction matches the four estimated AOAs (e.g., differs from the AOAs by less than a second threshold angular value), the candidate position is considered to align with the four estimated AOAs. The first and second threshold angular values are application dependent and, in some embodiments, may be predetermined or otherwise provided by a user of the system, as described previously with respect to the threshold power value. These threshold angular values may be selected based on operational requirements, such as probability of detection versus probability of false alarm, or other operational requirements.

At operation 460, if the direction to the candidate position aligns with the four or more estimated AOAs, the spoofer 110 is reported as a GPS constellation repeater spoofer and the estimated spoofer geolocation 190 is reported to a user of the system, or a downstream application configured to act on that information.

If, however, the direction to the candidate position does not align with the four or more estimated AOAs (e.g., the candidate position is in a different direction), then the spoofer 110 is reported as not being a GPS constellation repeater spoofer and a geolocation estimate is not possible using the disclosed techniques.

In some embodiments, the spoofer geolocation estimator 180 may be implemented as one or more processors configured to execute software to perform the functions of blocks 400 through 450.

Methodology

Figure 5:
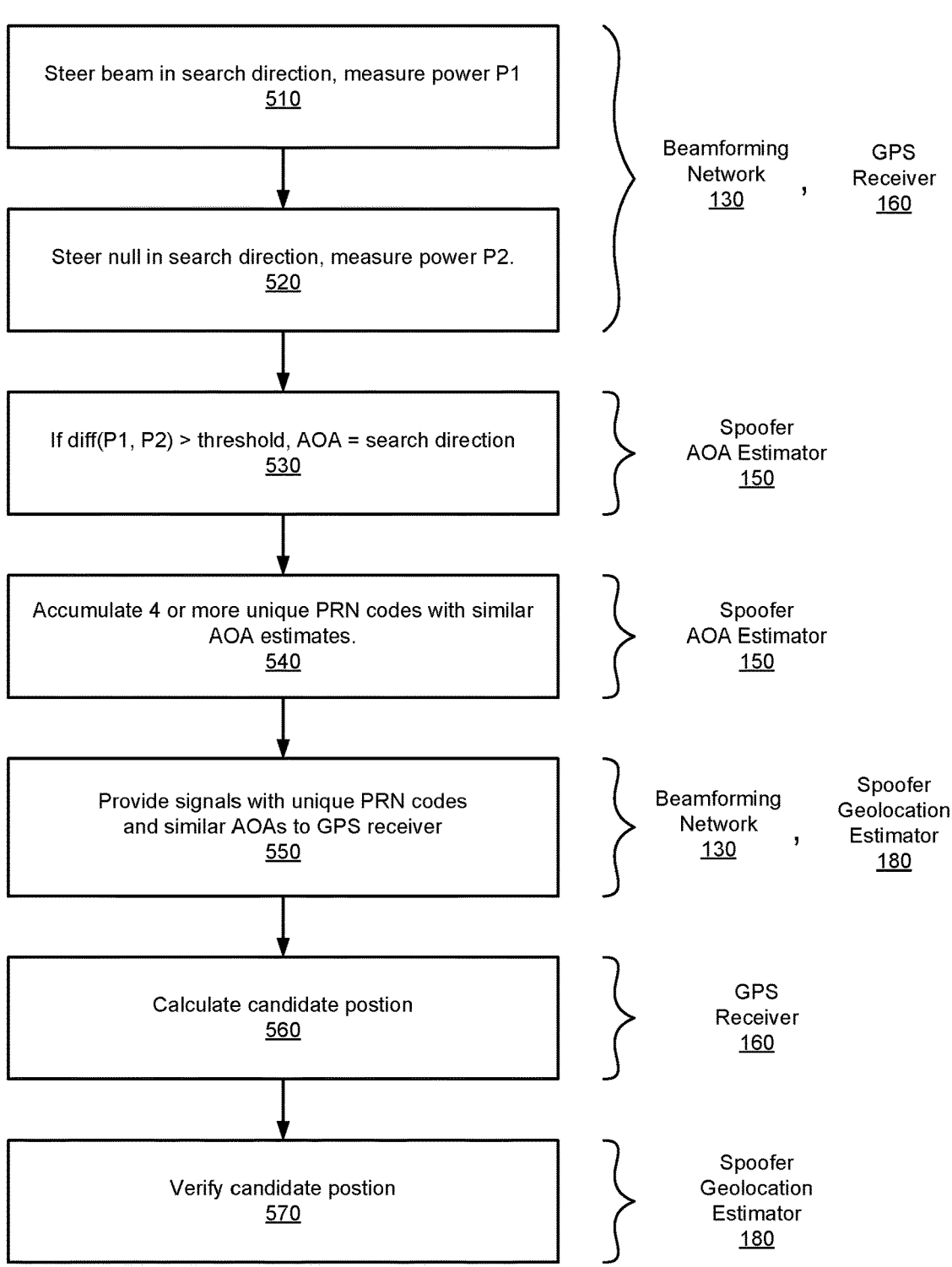
FIG. 5 is a flowchart illustrating a methodology for direction finding and geolocation of a GPS spoofer, in accordance with an embodiment of the present disclosure.

FIG. 5 is a flowchart illustrating a methodology 500 for GPS spoofer direction finding and geolocation, in accordance with an embodiment of the present disclosure. As can be seen, example method 500 includes a number of phases and sub-processes, the sequence of which may vary from one embodiment to another. However, when considered in aggregate, these phases and sub-processes form a process for GPS spoofer direction finding and geolocation, in accordance with certain of the embodiments disclosed herein. These embodiments can be implemented, for example using the system architecture illustrated in FIGS. 1-4, as described above. However other system architectures can be used in other embodiments, as will be apparent in light of this disclosure. To this end, the correlation of the various functions shown in FIG. 5 to the specific components illustrated in FIGS. 1, 2, and 4, is not intended to imply any structural and/or use limitations. Rather other embodiments may include, for example, varying degrees of integration wherein multiple functionalities are effectively performed by one system. Numerous variations and alternative configurations will be apparent in light of this disclosure.

In one embodiment, method 500 commences, at operation 510, by steering a beam in a direction selected from a search constellation and measuring a first signal power (P1) received through the steered beam. In some embodiments, the search constellation comprises a plurality of azimuth angles and elevation angles associated with a search region of interest. In some embodiments, the search region of interest excludes directions associated with known positions of GPS satellites. In some embodiments, the search region of interest is restricted to directions near the horizon, where GPS spoofers are more likely to be located.

At operation 520, the method continues by steering a null in the direction selected from the search constellation and measuring a second signal power (P2) received through the steered null.

At operation 530, a difference is calculated between P1 and P2 and, if the difference exceeds a threshold power value, the AOA of the GPS spoofer signal is estimated to be the selected direction.

At operation 540, the process iterates over multiple PRN code signals and additional estimated AOAs are accumulated. In some embodiments, multiple points in the constellation may be searched in parallel as computational resources permit, rather than in a sequential iterative manner.

At operation 550, after four or more unique PRN codes with substantially similar estimated AOAs (e.g., differ by less than a threshold angular value) have been accumulated, those signals are provided to a GPS receiver.

At operation 560, the GPS receiver calculates a navigation solution, based on the four or more provided signals, to generate a candidate position of the source of the GPS spoofer signals.

At operation 570, the candidate position is determined to be the estimated geolocation of the source of the GPS spoofer signals if the direction to the candidate position aligns with the estimated AOAs. In some embodiments, a direction to the candidate position is calculated and if that direction differs from the estimated AOAs by less than a second threshold angular value, the candidate position is considered to align with the estimated AOAs.

In some embodiments, additional operations may be performed, as previously described in connection with the system. For example, the process may be initiated or triggered by the detection of a GPS spoofer provided by another system.

In some embodiments, an approximate current time and position of the platform hosting the system, along with the attitude of the antenna array (e.g., roll, pitch, and yaw), may be provided to allow for the determination of directions in antenna coordinates.

Example System

Figure 6:
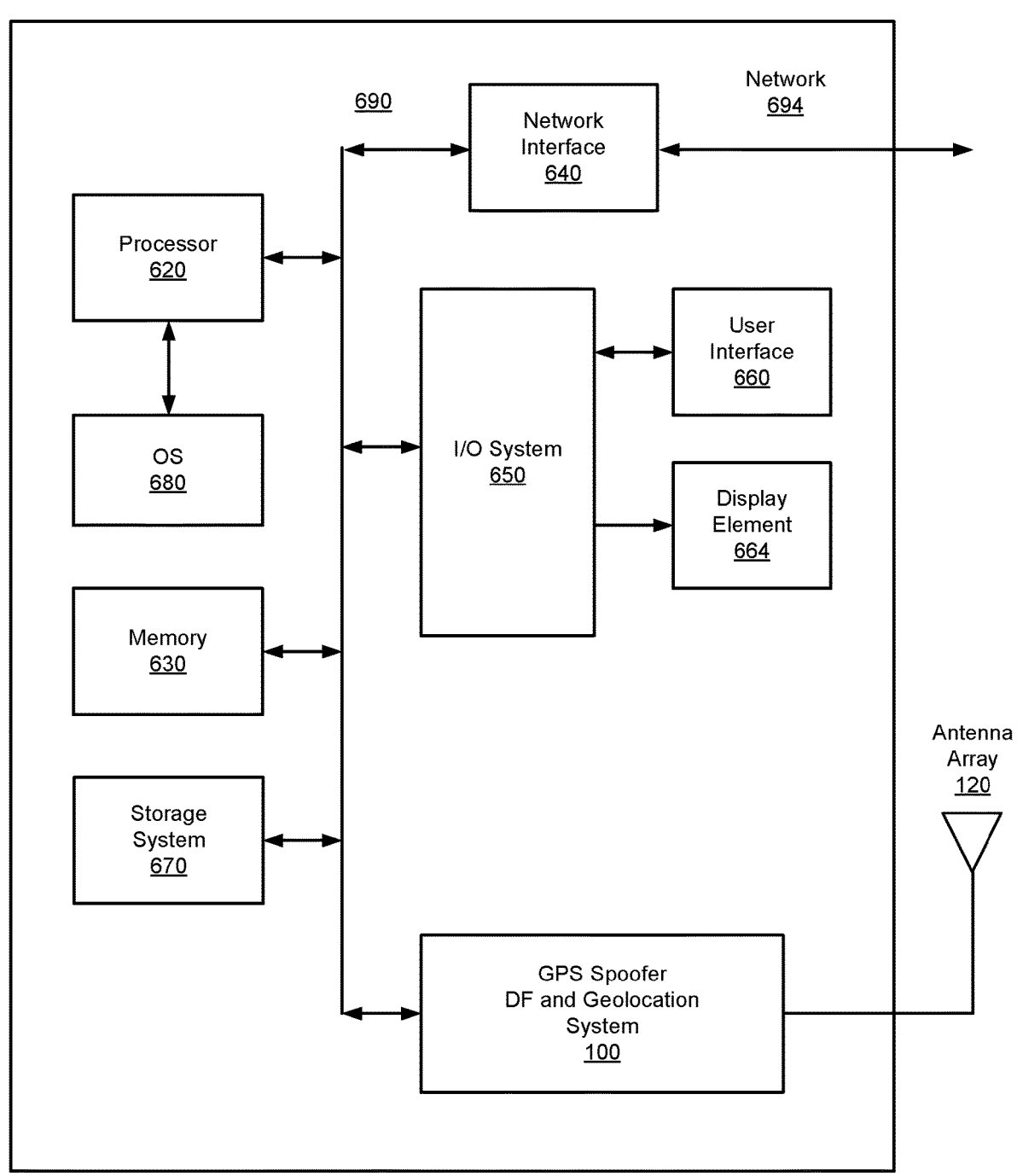
FIG. 6 is a block diagram of a platform configured with the GPS spoofer direction finding and geolocation system of FIG. 1, in accordance with certain embodiments of the present disclosure.

FIG. 6 is a block diagram of a platform 600 for the GPS spoofer direction finding and geolocation system FIG. 1, in accordance with certain embodiments of the present disclosure. In some embodiments, platform 600, or portions thereof, may be hosted on, or otherwise be incorporated into an aircraft, the electronic systems of the aircraft, a ground vehicle, a ship, a ground station, a personal computer, workstation, laptop computer, tablet, touchpad, portable computer, handheld computer, cellular telephone, smartphone, embedded system, or any other suitable platform where direction finding and geolocation of GPS spoofers is performed. Any combination of different devices may be used in certain embodiments.

In some embodiments, platform 600 may comprise any combination of a processor 620, a memory 630, a network interface 640, an input/output (I/O) system 650, a user interface 660, a display element 664, a storage system 670, antenna array 120, and GPS spoofer direction finding and geolocation system 100. As can be further seen, a bus and/or interconnect 690 is also provided to allow for communication between the various components listed above and/or other components not shown. Platform 600 can be coupled to a network 694 through network interface 640 to allow for communications with other computing devices, platforms, devices to be controlled, or other resources. Other componentry and functionality not reflected in the block diagram of FIG. 6 will be apparent in light of this disclosure, and it will be appreciated that other embodiments are not limited to any particular hardware configuration.

Processor 620 can be any suitable processor, and may include one or more coprocessors or controllers, such as an audio processor, a graphics processing unit, or hardware accelerator, to assist in control and processing operations associated with platform 600. In some embodiments, the processor 620 may be implemented as any number of processor cores. The processor (or processor cores) may be any type of processor, such as, for example, a microprocessor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 620 may be implemented as a complex instruction set computer (CISC) or a reduced instruction set computer (RISC) processor. In some embodiments, processor 620 may be configured as an x86 instruction set compatible processor.

Memory 630 can be implemented using any suitable type of digital storage including, for example, flash memory and/or random-access memory (RAM). In some embodiments, the memory 630 may include various layers of memory hierarchy and/or memory caches. Memory 630 may be implemented as a volatile memory device such as, but not limited to, a RAM, dynamic RAM (DRAM), or static RAM (SRAM) device. Storage system 670 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 670 may comprise technology to increase the storage performance enhanced protection for valuable digital media when multiple hard drives are included.

Processor 620 may be configured to execute an Operating System (OS) 680 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 600, and therefore may also be implemented using any suitable existing or subsequently-developed platform.

Network interface circuit 640 can be any appropriate network chip or chipset which allows for wired and/or wireless connection between other components of platform 600 and/or network 694, thereby enabling platform 600 to communicate with other local and/or remote computing systems, servers, cloud-based servers, and/or other resources. Wired communication may conform to existing (or yet to be developed) standards, such as, for example, Ethernet or serial interfaces (e.g., RS-232 or RS-422). Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 650 may be configured to interface between various I/O devices and other components of platform 600. I/O devices may include, but not be limited to, user interface 660 and display element 664. User interface 660 may include devices (not shown) such as a touchpad, keyboard, and mouse, etc., for example, to allow the user to control the system. Display element 664 may be configured to display jammer detection results, tracking data, navigation data, camera images, or other suitable information. I/O system 650 may include a graphics subsystem configured to perform processing of images for rendering on the display element 664. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 620 or any chipset of platform 600.

It will be appreciated that in some embodiments, the various components of platform 600 may be combined or integrated in a system-on-a-chip (SoC) architecture. In some embodiments, the components may be hardware components, firmware components, software components or any suitable combination of hardware, firmware, or software.

GPS spoofer direction finding and geolocation system 100 is configured to estimate an AOA of received GPS spoofer signals, and in some embodiments, determine a geolocation of the source of the GPS spoofer signals, as described previously. GPS spoofer direction finding and geolocation system 100 may include any or all of the circuits/components illustrated in FIGS. 1, 2, and 4, as described above. These components can be implemented or otherwise used in conjunction with a variety of suitable software and/or hardware that is coupled to or that otherwise forms a part of platform 600. These components can additionally or alternatively be implemented or otherwise used in conjunction with user I/O devices that are capable of providing information to, and receiving information and commands from, a user.

In some embodiments, these circuits may be installed local to platform 600, as shown in the example embodiment of FIG. 6. Alternatively, platform 600 can be implemented in a client-server arrangement wherein at least some functionality associated with these circuits is provided to platform 600 using an applet, such as a Java applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 694 or remotely coupled to network 694 by one or more other networks and/or communication channels. In some cases, access to resources on a given network or computing system may require credentials such as usernames, passwords, and/or compliance with any other suitable security mechanism.

In various embodiments, platform 600 may be implemented as a wireless system, a wired system, or a combination of both. When implemented as a wireless system, platform 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, application-specific integrated circuits (ASICs, or other purpose-built semiconductor), programmable logic devices, digital signal processors, field programmable gate arrays (FPGAs), logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic. NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 694. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 600 may comprise additional, fewer, or alternative subcomponents as compared to those included in the example embodiment of FIG. 6.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional structures that include hardware, or a combination of hardware and software, and may comprise, for example, singly or in any combination, hardwired circuitry, programmable circuitry such as computer processors comprising one or more individual instruction processing cores, state machine circuitry, and/or gate level logic. The circuitry may include a processor and/or controller programmed or otherwise configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., non-volatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable device. In any such hardware cases that include executable software, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a computer program product including one or more non-transitory machine-readable mediums encoded with instructions that when executed by one or more processors cause a process to be carried out for locating a global positioning system (GPS) spoofer, the process comprising: steering a beam in a direction selected from a search constellation; measuring a first signal power received through the steered beam; steering a null in the direction selected from the search constellation; measuring a second signal power received through the steered null; calculating a difference between the first signal power and the second signal power; estimating an angle of arrival (AOA) of a GPS spoofer signal as the selected direction if the calculated difference exceeds a threshold power value; and identifying a pseudo-random noise (PRN) code of the GPS spoofer signal.

Example 2 includes the computer program product of Example 1, wherein the process further comprises iterating the process for a plurality of directions selected from the search constellation and accumulating a plurality of estimated AOAs and identified PRN codes associated with GPS spoofer signals.

Example 3 includes the computer program product of Example 2, wherein the process further comprises, in response to accumulating four or more estimated AOAs, each estimated AOA associated with a unique PRN code: determining that the four or more estimated AOAs having unique PRN codes differ by less than a threshold angular value; and providing the four or more GPS spoofer signals associated with the four or more unique PRN codes to a GPS receiver.

Example 4 includes the computer program product of Example 3, wherein the process further comprises calculating, using the GPS receiver, a candidate position of a source of the GPS spoofer signals based on the provided four or more GPS spoofer signals.

Example 5 includes the computer program product of Example 4, wherein the threshold angular value is a first threshold angular value, and the process further comprises: calculating a direction to the candidate position; determining if the direction to the candidate position differs from the estimated AOAs by less than a second threshold angular value; and in response to the determination, reporting the candidate position as an estimated position of the source of the GPS spoofer signals.

Example 6 includes the computer program product of any of Examples 1-5, wherein the search constellation comprises a plurality of azimuth angles and elevation angles associated with a search region of interest.

Example 7 includes the computer program product of Example 6, wherein the search region of interest excludes directions associated with known positions of GPS satellites.

Example 8 is a system for locating a global positioning system (GPS) spoofer, the system comprising: a beamforming network configured to steer a beam in a selected direction and to steer a null in the selected direction; and a spoofer angle of arrival (AOA) estimation circuit configured to choose the selected direction from a search constellation comprising a plurality of directions, measure a first signal power received through the steered beam, measure a second signal power received through the steered null, calculate a difference between the first signal power and the second signal power, estimate an AOA of a GPS spoofer signal as the selected direction if the calculated difference exceeds a threshold power value, and identify a pseudo-random noise (PRN) code of the GPS spoofer signal.

Example 9 includes the system of Example 8, wherein the system is configured to iterate the process for the plurality of directions selected from the search constellation and accumulate a plurality of estimated AOAs and identified PRN codes associated with GPS spoofer signals.

Example 10 includes the system of Example 9, wherein the system further comprises a GPS receiver and a spoofer location estimator circuit configured to: in response to accumulating four or more estimated AOAs, each estimated AOA associated with a unique PRN code, determine that the four or more estimated AOAs having unique PRN codes differ by less than a threshold angular value; and provide the four or more GPS spoofer signals associated with the four or more unique PRN codes to the GPS receiver.

Example 11 includes the system of Example 10, wherein the spoofer location estimator circuit is further configured to employ the GPS receiver to calculate a candidate position of a source of the GPS spoofer signals based on the provided four or more GPS spoofer signals.

Example 12 includes the system of Example 11, wherein the threshold angular value is a first threshold angular value, and the spoofer location estimator circuit is further configured to: calculate a direction to the candidate position; determine if the direction to the candidate position differs from the estimated AOAs by less than a second threshold angular value; and in response to the determination, report the candidate position as an estimated position of the source of the GPS spoofer signals.

Example 13 includes the system of any of Examples 8-12, wherein the search constellation comprises a plurality of azimuth angles and elevation angles associated with a search region of interest and excludes directions associated with known positions of GPS satellites.

Example 14 includes the system of any of Examples 8-13, wherein the spoofer AOA estimation circuit and the location estimator circuit comprise one or more processors and one or more memories encoded with instructions.

Example 15 is a method for locating a global positioning system (GPS) spoofer, the method comprising: steering, by a processor based system, a beam in a direction selected from a search constellation; measuring, by the processor based system, a first signal power received through the steered beam; steering, by the processor based system, a null in the direction selected from the search constellation; measuring, by the processor based system, a second signal power received through the steered null; calculating, by the processor based system, a difference between the first signal power and the second signal power; and estimating, by the processor based system, an angle of arrival (AOA) of a GPS spoofer signal as the selected direction if the calculated difference exceeds a threshold power value; and identifying, by the processor based system, a pseudo-random noise (PRN) code of the GPS spoofer signal.

Example 16 includes the method of Example 15, further comprising iterating the process for a plurality of directions selected from the search constellation and accumulating a plurality of estimated AOAs and identified PRN codes associated with GPS spoofer signals.

Example 17 includes the method of Example 16, further comprising, in response to accumulating four or more estimated AOAs, each estimated AOA associated with a unique PRN code: determining that the four or more estimated AOAs having unique PRN codes differ by less than a threshold angular value; and providing the four or more GPS spoofer signals associated with the four or more unique PRN codes to a GPS receiver.

Example 18 includes the method of Example 17, further comprising calculating, using the GPS receiver, a candidate position of a source of the GPS spoofer signals based on the provided four or more GPS spoofer signals.

Example 19 includes the method of Example 18, wherein the threshold angular value is a first threshold angular value, and the method further comprises: calculating a direction to the candidate position; determining if the direction to the candidate position differs from the estimated AOAs by less than a second threshold angular value; and in response to the determination, reporting the candidate position as an estimated position of the source of the GPS spoofer signals.

Example 20 includes the method of any of Examples 15-19, wherein the search constellation comprises a plurality of azimuth angles and elevation angles associated with a search region of interest and the search region of interest excludes directions associated with known positions of GPS satellites.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A computer program product including one or more non-transitory machine-readable mediums encoded with instructions that when executed by one or more processors cause a process to be carried out for locating a global positioning system (GPS) spoofer, the process comprising:

steering a beam in a direction selected from a search constellation;

measuring a first signal power received through the steered beam;

steering a null in the direction selected from the search constellation;

measuring a second signal power received through the steered null;

calculating a difference between the first signal power and the second signal power;

estimating an angle of arrival (AOA) of a GPS spoofer signal as the selected direction if the calculated difference exceeds a threshold power value; and identifying a pseudo-random noise (PRN) code of the GPS spoofer signal.

2. The computer program product of claim 1, wherein the process further comprises iterating the process for a plurality of directions selected from the search constellation and accumulating a plurality of estimated AOAs and identified PRN codes associated with GPS spoofer signals.

3. The computer program product of claim 2, wherein the process further comprises, in response to accumulating four or more estimated AOAs, each estimated AOA associated with a unique PRN code:

determining that the four or more estimated AOAs having unique PRN codes differ by less than a threshold angular value; and providing the four or more GPS spoofer signals associated with the four or more unique PRN codes to a GPS receiver.

4. The computer program product of claim 3, wherein the process further comprises calculating, using the GPS receiver, a candidate position of a source of the GPS spoofer signals based on the provided four or more GPS spoofer signals.

5. The computer program product of claim 4, wherein the threshold angular value is a first threshold angular value, and the process further comprises:

calculating a direction to the candidate position;

determining if the direction to the candidate position differs from the estimated AOAs by less than a second threshold angular value; and in response to the determination, reporting the candidate position as an estimated position of the source of the GPS spoofer signals.

6. The computer program product of claim 1, wherein the search constellation comprises a plurality of azimuth angles and elevation angles associated with a search region of interest.

7. The computer program product of claim 6, wherein the search region of interest excludes directions associated with known positions of GPS satellites.

8. A system for locating a global positioning system (GPS) spoofer, the system comprising:

a beamforming network configured to steer a beam in a selected direction and to steer a null in the selected direction; and a spoofer angle of arrival (AOA) estimation circuit configured to choose the selected direction from a search constellation comprising a plurality of directions, measure a first signal power received through the steered beam, measure a second signal power received through the steered null, calculate a difference between the first signal power and the second signal power, estimate an AOA of a GPS spoofer signal as the selected direction if the calculated difference exceeds a threshold power value, and identify a pseudo-random noise (PRN) code of the GPS spoofer signal.

9. The system of claim 8, wherein the system is configured to iterate the process for the plurality of directions selected from the search constellation and accumulate a plurality of estimated AOAs and identified PRN codes associated with GPS spoofer signals.

10. The system of claim 9, wherein the system further comprises a GPS receiver and a spoofer location estimator circuit configured to:

in response to accumulating four or more estimated AOAs, each estimated AOA associated with a unique PRN code, determine that the four or more estimated AOAs having unique PRN codes differ by less than a threshold angular value; and provide the four or more GPS spoofer signals associated with the four or more unique PRN codes to the GPS receiver.

11. The system of claim 10, wherein the spoofer location estimator circuit is further configured to employ the GPS receiver to calculate a candidate position of a source of the GPS spoofer signals based on the provided four or more GPS spoofer signals.

12. The system of claim 11, wherein the threshold angular value is a first threshold angular value, and the spoofer location estimator circuit is further configured to:

calculate a direction to the candidate position;

determine if the direction to the candidate position differs from the estimated AOAs by less than a second threshold angular value; and in response to the determination, report the candidate position as an estimated position of the source of the GPS spoofer signals.

13. The system of claim 8, wherein the search constellation comprises a plurality of azimuth angles and elevation angles associated with a search region of interest and excludes directions associated with known positions of GPS satellites.

14. The system of claim 8, wherein the spoofer AOA estimation circuit and the location estimator circuit comprise one or more processors and one or more memories encoded with instructions.

15. A method for locating a global positioning system (GPS) spoofer, the method comprising:

steering, by a processor based system, a beam in a direction selected from a search constellation;

measuring, by the processor based system, a first signal power received through the steered beam;

steering, by the processor based system, a null in the direction selected from the search constellation;

measuring, by the processor based system, a second signal power received through the steered null;

calculating, by the processor based system, a difference between the first signal power and the second signal power; and determining, by the processor based system, that the calculated difference exceeds a threshold power value;

in response to the determining, estimating, by the processor based system, an angle of arrival (AOA) of a GPS spoofer signal as the selected direction; and identifying, by the processor based system, a pseudo-random noise (PRN) code of the GPS spoofer signal.

16. The method of claim 15, further comprising iterating the process for a plurality of directions selected from the search constellation and accumulating a plurality of estimated AOAs and identified PRN codes associated with GPS spoofer signals.

17. The method of claim 16, further comprising, in response to accumulating four or more estimated AOAs, each estimated AOA associated with a unique PRN code:

determining that the four or more estimated AOAs having unique PRN codes differ by less than a threshold angular value; and providing the four or more GPS spoofer signals associated with the four or more unique PRN codes to a GPS receiver.

18. The method of claim 17, further comprising calculating, using the GPS receiver, a candidate position of a source of the GPS spoofer signals based on the provided four or more GPS spoofer signals.

19. The method of claim 18, wherein the threshold angular value is a first threshold angular value, and the method further comprises:

calculating a direction to the candidate position;

determining if the direction to the candidate position differs from the estimated AOAs by less than a second threshold angular value; and in response to the determination, reporting the candidate position as an estimated position of the source of the GPS spoofer signals.

20. The method of claim 15, wherein the search constellation comprises a plurality of azimuth angles and elevation angles associated with a search region of interest and the search region of interest excludes directions associated with known positions of GPS satellites.

* * * * *